US012565332B2

(12) United States Patent
Zahlen et al.

(10) Patent No.: US 12,565,332 B2
(45) Date of Patent: Mar. 3, 2026

(54) METHOD AND MOUNTING SYSTEM FOR MOUNTING A PROFILE COMPONENT ON AN AIRCRAFT STRUCTURAL COMPONENT

(71) Applicant: Airbus Operations GmbH, Hamburg (DE)

(72) Inventors: Pierre Zahlen, Hamburg (DE); Philipp Timmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/532,303

(22) Filed: Dec. 7, 2023

(65) Prior Publication Data

US 2024/0199232 A1 Jun. 20, 2024

(30) Foreign Application Priority Data

Dec. 19, 2022 (EP) ..................................... 22214506

(51) Int. Cl.
 B64F 5/10 (2017.01)
 B25J 11/00 (2006.01)
(52) U.S. Cl.
 CPC ............... B64F 5/10 (2017.01); B25J 11/005 (2013.01)
(58) Field of Classification Search
 CPC .......... B25J 11/005; B64F 5/10; B21J 15/142; B23P 2700/01
 See application file for complete search history.

(56) References Cited

U.S. PATENT DOCUMENTS

| | | | | |
|---|---|---|---|---|
| 4,955,119 A | * | 9/1990 | Bonomi | B25J 15/0019 |
| | | | | 901/41 |
| 5,404,641 A | * | 4/1995 | Bratten | B23B 41/00 |
| | | | | 29/458 |
| 5,482,409 A | * | 1/1996 | Dunning | B23Q 9/00 |
| | | | | 408/46 |
| 6,428,452 B1 | * | 8/2002 | Dahlstrom | B25J 17/0216 |
| | | | | 483/56 |
| 7,967,549 B2 | * | 6/2011 | Geist | B25J 9/06 |
| | | | | 414/744.5 |
| 7,987,575 B2 | * | 8/2011 | Hotz | B25J 5/02 |
| | | | | 29/430 |

(Continued)

OTHER PUBLICATIONS

European Search Report for corresponding European Patent Application No. 22214506.2 dated Jun. 16, 2023; priority document.

*Primary Examiner* — Michael W Hotchkiss
(74) *Attorney, Agent, or Firm* — Greer, Burns & Crain, Ltd.

(57) ABSTRACT

A method and mounting system for mounting a profile component on an internal frame structural component of an aircraft. The method comprises the steps: picking-up the profile component by a gripping device arranged on a tool holder; guiding the tool holder through an opening in an outer skin of the aircraft into the interior of the aircraft by a robot arm; aligning, arranging and fixing the profile component to the frame structural component in an installed position by a first fastening arrangement; releasing the gripping device; and fastening the profile component to the frame structural component by at least one second fastening arrangement. The first and second fastening arrangements are attached by a fastener device arranged on the tool holder.

15 Claims, 4 Drawing Sheets

(56) References Cited

U.S. PATENT DOCUMENTS

| | | | |
|---|---|---|---|
| 8,051,547 B2 * | 11/2011 | Toh | B21J 15/14 |
| | | | 29/709 |
| 8,301,302 B2 * | 10/2012 | Sarh | B21J 15/142 |
| | | | 414/737 |
| 9,764,464 B2 * | 9/2017 | Sarh | B25J 9/106 |
| 9,840,010 B2 * | 12/2017 | Lee | B23Q 3/15713 |
| 2008/0000070 A1 * | 1/2008 | Hotz | B62D 65/14 |
| | | | 29/431 |
| 2017/0066143 A1 * | 3/2017 | Häntzschel | B25J 15/0066 |
| 2017/0165844 A1 * | 6/2017 | Brockway | B21J 15/142 |
| 2017/0312923 A1 * | 11/2017 | Erickson | B25J 19/023 |
| 2019/0168388 A1 * | 6/2019 | Pringle, IV | B25J 17/0283 |
| 2020/0361079 A1 * | 11/2020 | Gunther | B25J 19/007 |
| 2021/0339888 A1 * | 11/2021 | Jackson | B23B 47/28 |
| 2022/0153438 A1 * | 5/2022 | Smith | B64F 5/50 |
| 2023/0107716 A1 * | 4/2023 | Georgeson | B05C 11/00 |
| | | | 156/64 |

* cited by examiner

FIG 7

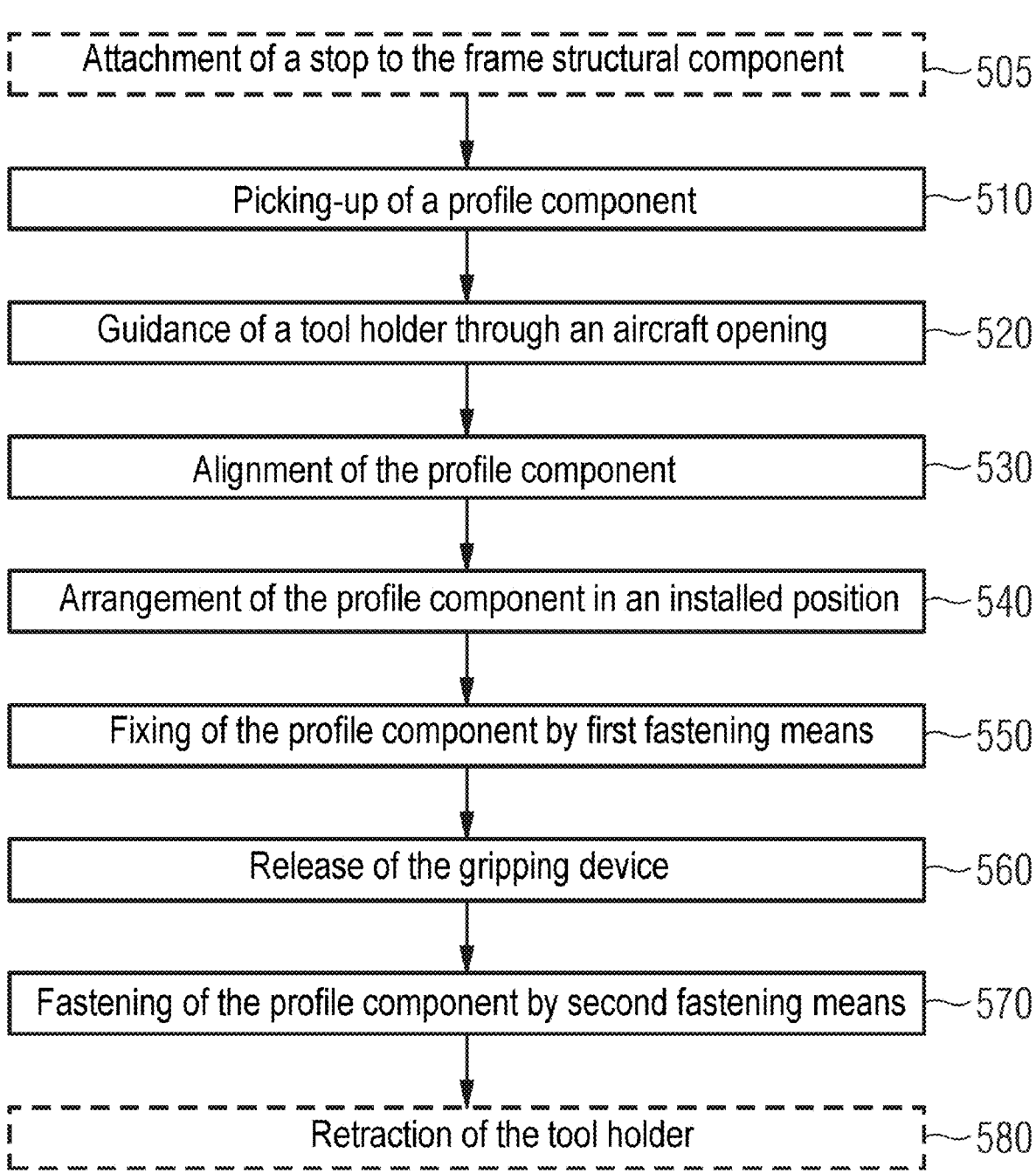

| | |
|---|---|
| Attachment of a stop to the frame structural component | ~505 |
| Picking-up of a profile component | ~510 |
| Guidance of a tool holder through an aircraft opening | ~520 |
| Alignment of the profile component | ~530 |
| Arrangement of the profile component in an installed position | ~540 |
| Fixing of the profile component by first fastening means | ~550 |
| Release of the gripping device | ~560 |
| Fastening of the profile component by second fastening means | ~570 |
| Retraction of the tool holder | ~580 |

METHOD AND MOUNTING SYSTEM FOR MOUNTING A PROFILE COMPONENT ON AN AIRCRAFT STRUCTURAL COMPONENT

CROSS-REFERENCES TO RELATED APPLICATIONS

This application claims the benefit of the European patent application No. 22214506.2 filed on Dec. 19, 2022, the entire disclosures of which are incorporated herein by way of reference.

FIELD OF THE INVENTION

The invention relates to a method for mounting a profile component on a frame structural component of an aircraft and a corresponding mounting system for carrying out the method. In particular, the invention relates to a method and mounting system for mounting a profile component on an internal frame structural component, wherein the profile component is held by a gripping device, which is moved from a region outside the aircraft through an opening into the aircraft, and is attached to the frame structural component.

BACKGROUND OF THE INVENTION

Frame structural components of an aircraft are frame components arranged in the interior of an aircraft, such as, for example, ribs (frames), stringers or the like, which have to be partially assembled or have to be reinforced. To this end, profile components, such as, for example, couplings, doubled-up portions, and the like, are placed on one or more frame components and connected to the frame component.

These operations generally take place, however, in regions of the aircraft which can be difficult to access or at least from an ergonomic point of view are located in awkward areas for personnel. The connection of the frame components to corresponding profile components is carried out, for example, by bonding, screwing, riveting or even clamping. The tools required therefor are generally heavy or at least bulky, whereby the installation is made even more difficult for personnel.

The object of the invention, therefore, is to provide a method and mounting system for the simpler mounting of profile components.

SUMMARY OF THE INVENTION

According to a first aspect for improved understanding of the present disclosure, a method for mounting a profile component onto an internal frame structural component of an aircraft comprises a series of operating steps. The method starts with the picking-up of a profile component by a gripping device arranged on a tool holder. The profile component can be a coupling, doubled-up portion, angled portion, tab or the like. The profile component can, however, also be a window frame or a part of a window frame or a part of an outer skin. The frame structural component in turn can be, for example, a rib (frame), stringer, window frame, wing, wing box, an outer skin or the like, or one or more parts/portions of these frame structural components. The method is thus also suitable for forming portions of an aircraft fuselage and/or for connecting two portions of an aircraft fuselage, such as for example joining together two barrel-shaped fuselage portions.

The method continues with a guidance of the tool holder through an opening in an outer skin of the aircraft into the interior of the aircraft, wherein the guidance of the tool holder is carried out by a robot arm. The opening in the outer skin of the aircraft can be any opening which is present in the outer skin. For example, window openings, door openings, loading hatches, service openings or even a manhole, which optionally are already present in the aircraft fuselage, are mentioned here. As a result, no additional openings have to be provided for the mounting.

This is followed by the method steps of an alignment of the profile component by the tool holder relative to the frame structural component, an arrangement of the profile component in an installed position on the frame structural component, and a fixing of the profile component to the frame structural component in the installed position by a first fastening means. The alignment of the profile component relates, in particular, to an approximate (rough) arrangement of the profile component adjacent to the frame structural component and is generally dictated by the different alignments of the profile component when the profile component is guided through the opening, on the one hand, and the installed position to be achieved, on the other hand. The alignment can be carried out, for example, by any movement of the robot arm and/or the tool holder and/or the gripping device, such as for example a rotation about one or more axes and/or a linear movement and/or a curved movement.

The arrangement of the profile component can comprise, as in the case of the alignment, any movement which is carried out by the robot arm and/or the tool holder and/or the gripping device. The profile component is moved into its installed position, for example a position in which the profile component is positioned or bears against the frame structural component. The arrangement of the profile component can comprise (in contrast to the alignment) a positioning, placing or a different type of positioning of the profile component relative to the frame structural component.

The fixing of the profile component to the frame structural component is thus possible in the installed position. For fixing the profile component it is sufficient if a first fastening means is used, wherein, in particular, this can be a single first fastening means. As a result, the profile component can be held in the installed position.

After the fixing of the profile component, the method can continue with the following steps: release of the gripping device from the profile component and fastening of the profile component to the frame structural component by at least one second fastening means. By the release of the gripping device, the outer surface of the profile component is freely accessible, so that further fastening means, in particular at least one second fastening means, can be attached. For example, a plurality of second fastening means can be attached.

Moreover, the first and second fastening means is attached by a fastener device arranged on the tool holder. This permits a compact structural shape of the required mounting devices at the free end of the robot arm, i.e., a compact structural shape of the end effector of the robot. By the arrangement of the fastener device and the gripping device on the tool holder, on the one hand, the fastening means can be attached while the gripping device secures the profile component. On the other hand, after the release of the gripping device the fastener device can operate unhindered and at any position of the profile component.

Overall, the profile component can be attached in a simple manner at the correct position (installed position) by means of the method. The method also permits an automation or semi-automation of the installation process. Since a part of the robot arm is arranged outside the aircraft, and, in particular, the foot of the robot is arranged outside the aircraft, the method additionally simplifies the attachment of profile components. The structures and preparatory operations in the interior of the aircraft, which are generally required in order to guide and to operate tools in the interior of the aircraft, are dispensed with. In addition, the personnel tasked with the installation have to carry and guide fewer tools, such as for example the fastener device.

In a variant, the first fastening means and the second fastening means can be of the same type. The structural shape of the first and second fastening means is identical here. The first and second fastening means only differ in the chronological sequence of the attachment to the profile component and the frame structural component. This permits the use of a smaller number of elements when fastening the profile component.

In a further variant, the method can also comprise an attachment of a stop to the frame structural component before the alignment of the profile component and/or before the arrangement of the profile component in the installed position. This stop simplifies the alignment and/or arrangement of the profile component in the installed position since a mechanical stop is provided. For example, the profile component can be placed against the stop while the gripping device holds the profile component. Thus, not only is locating the installed position facilitated and a (semi-) automation permitted. The stop can also undertake a certain (temporary) holding function, in particular, after the first fastening means fixes the profile component.

The stop can also be implemented chronologically independently of the introduction of the profile component. As a result, preparatory operations can be carried out independently of the attachment of the profile component as soon as the frame structural component is available for such preparatory operations.

Naturally, a stop can also be present in the form of a further element against which the profile component can bear in a mechanically effective manner. Merely by way of example, an already attached different profile component, a further frame structural component or the like, can form a further element which during the arrangement of the profile component forms a mechanical support for the profile component. Also, merely by way of example, front faces or side edges, or the like, of the profile component and the further element can bear against one another, whereby the further element forms a stop.

In a further variant, the attachment of the stop can be carried out by the fastener device. For example, the fastener device can attach the stop before the profile component is aligned and/or before the arrangement of the profile component in the installed position. As a result, a certain (semi-)automation can also be implemented. On the other hand, fewer tools need to be used in order to place the profile component.

Alternatively or additionally, the stop can be a fastening means. As a result, the number of components required can be reduced. In addition, it is ensured that the fastening means is suitable for the frame structural component, whereby an additional suitability test (certification) of the stop is not required. Since the stop is attached to the frame structural component before the profile component is connected thereto, after the profile component is completely fastened to the frame structural component the fastening means (the stop) can also merely be present in the frame structural component and not undertake any actual fastening function.

In a further variant, the profile component can have a shape which corresponds or cooperates with the stop. For example, the stop can protrude from a surface of the frame structural component, while the profile component has a recess or opening which faces the frame structural component and which at least partially surrounds, covers, or bears against the stop when the profile component is in the end position. For example, the profile component can also have a side edge, the path thereof surrounding and/or bearing against the stop at least in some portions when the profile component is arranged in the end position. In other words, at least one side edge of the profile component can bear against the stop, so that the profile component can slide with a side edge on the stop (for example for tolerance compensation) or can bear with two side edges against the stop and only slide in one direction along a side edge. Naturally, more sides of the profile component or other shapes and surfaces of the profile component which cooperate with the stop in a mechanically effective manner can be present. Overall, in particular, the alignment and arrangement of the profile component in the installed position is facilitated and the stop also prevents the profile component from slipping during the fixing and until the profile component is fastened.

In yet another variant, the method can comprise a retraction of the tool holder through the opening. For example, the robot arm can guide the tool holder back through the opening in order to repeat the method and to pick up a further profile component and fasten it in the interior of the aircraft.

In a further variant, in the installed position the profile component can connect the frame structural component to a further frame structural component and/or reinforce the frame structural component and/or form a connecting element on the frame structural component for an aircraft component. Thus, the profile component is a coupling, linkage, connector, reinforcing element, doubled-up portion, tab, angled portion, or the like.

According to a second aspect for improved understanding of the present disclosure, a mounting system for mounting a profile component on an internal frame structural component of an aircraft comprises a robot arm which is installed outside the aircraft and a tool holder which is arranged at a free end of the robot arm. The robot arm, which is installed outside the aircraft, in particular, has a foot which is arranged outside the aircraft and bears the robot arm. The free end of the robot arm is an end of the robot arm opposing the foot.

The mounting system further comprises a gripping device which is arranged on the tool holder, a fastener device which is arranged on the tool holder and is designed to attach fastening means, and a control unit which is coupled to the robot arm, the tool holder, the gripping device and the fastener device, and is designed to carry out the method according to the first aspect or one of the variants thereof. The control unit is designed, in particular, to move the robot arm, the tool holder and the gripping device and to activate and deactivate the gripping device and the fastener device.

An activation of the gripping device takes place, in particular, when the profile component is picked up and held. A deactivation of the gripping device involves a release of the gripping device from the profile component. In addition, a deactivation of the gripping device can also comprise a removal of the gripping device from the profile component.

An activation of the fastener device comprises, for example, applying a voltage to an actuator or motor of the fastener device in order to position a fastening means.

In a variant, the gripping device can comprise a retaining bracket which is designed to support the profile component from at least one side and to hold the profile component on the frame structural component in the installed position. The retaining bracket can surround the profile component at least in some portions. The retaining bracket can also bear against the profile component or can be mechanically coupled in a different manner to the profile component.

Alternatively or additionally, the gripping device can comprise at least one pressing unit which is designed to press the profile component onto the frame structural component in the installed position. Thus, the pressing unit can assist with the arrangement and fixing of the profile component. The pressing unit can comprise, for example, one or more spring elements, actuators, motors, or the like, whereby the profile component is held in the end position by the at least one pressing unit. Merely by way of example, the pressing unit can be designed and arranged such that it is supported on the tool holder and/or the gripping device and/or the retaining bracket and applies a spring force onto the profile component. This spring force can preferably act on the profile component in the direction in which the frame structural component is located.

The pressing unit can also comprise a pressing pad, cushion or a similar support which bears against the profile component. As a result, a surface of the profile component can be protected.

Alternatively or additionally, the gripping device can also comprise at least one clamping device which is designed to hold the profile component releasably in the gripping device. The clamping device can comprise either a resilient element, which clamps the profile component, or comprise an actuator which is designed to clamp or release the profile component.

Alternatively or additionally, the gripping device can also comprise a magnet and/or a suction holder. In the case of a magnet, the profile component comprises at least one magnetic material, such as for example a metal, while in the case of a suction holder the surface of the profile component is as smooth as possible at the corresponding point.

In a variant, the fastener device can comprise a drill, a riveting tool, a screwing tool, a screwdriver, a welding head and/or an adhesive gun. In other words, the fastening means is a bolt, screw, threaded rod, etc. which can be guided via a bore produced by the drill through the profile component and the frame structural component, a rivet which is placed by the riveting tool through the profile component and the frame structural component, a (self-tapping) screw which is screwed into the material of the profile component and the frame structural component, or an adhesive which is applied via the adhesive gun. In the case of a welding head, the fastening means is a welding of the material of the profile component to the material of the frame structural component. If required, additional material can be applied between the profile component and frame structural component, the material being fused by the welding head and being connected to the materials of the profile component and the frame structural component.

Naturally, the fastener device can also comprise combinations of the aforementioned tools. A drill and a riveting tool are mentioned only by way of example, wherein the drill initially produces a bore through which a rivet is then placed.

The above-described aspects, embodiments, variants and examples can naturally be combined without this being explicitly described. Each of the described variants and each example are thus to be regarded as optional for each of the aspects, embodiments, variants and examples or already combinations thereof. The present disclosure is thus not limited to the individual embodiments and variants in the described sequence or a specific combination of the aspects and variants.

BRIEF DESCRIPTION OF THE DRAWINGS

Preferred exemplary embodiments of the invention are now explained in more detail with reference to the accompanying schematic drawings, in which:

FIG. 7 shows schematically a flow diagram of a method for mounting a profile component.

DETAILED DESCRIPTION OF THE PREFERRED EMBODIMENTS

Figure 1:
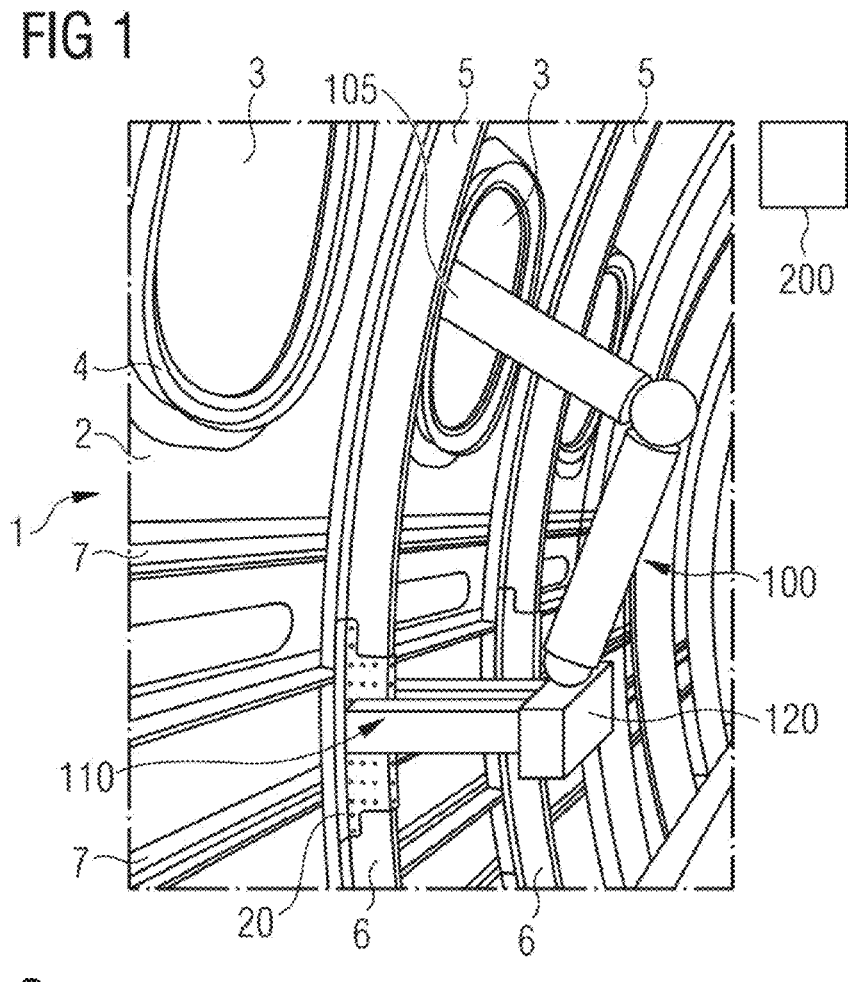
FIG. 1 shows schematically a detail of an aircraft and a mounting system in use.

FIG. 1 shows schematically a detail of an aircraft 1 and a mounting system 100 in use. The aircraft 1 is under construction, wherein frame structural components are already assembled and further frame structural components have to be added. In the state shown, the aircraft 1 comprises a plurality of ribs 5 which, merely by way of example, can consist of an upper rib portion 5 and a lower rib portion 6. At their point of intersection, the upper and lower rib portion 5, 6 are connected and joined together by a profile component, here a coupling 20 (or connector). The profile component 20 is positioned on the frame structural component 5, 6, i.e., it bears thereagainst, and partially surrounds the frame structural component 5, 6.

The aircraft 1 also has at least one opening 3 in an outer skin 2 of the aircraft 1. In the portion of the aircraft 1 shown, for example, window openings 3 which are already reinforced with window frames 4 are provided. In addition to the outer skin 2, stringers 7 can also be present between the ribs 5, 6.

The mounting system 100 comprises a robot arm 105 with the tool holder 120 arranged thereon, the profile component 20 being able to be attached thereby to the frame structural component 5, 6. The robot arm 105 and/or the tool holder 120 can be designed to pick up the profile component 20 and to guide the profile component through one of the openings 3 in the outer skin 2 into the interior of the aircraft 1. The remainder of the robot arm 105 or robot is located outside the aircraft 1 and cannot be identified in FIG. 1.

The profile component 20 can be aligned relative to the frame structural component 5, 6 and arranged in an installed position by the tool holder 120. To this end, a gripping device 110 (shown in detail in FIGS. 2 to 4) can be provided on the tool holder 120, the position thereof being indicated in FIG. 1. FIG. 1 shows the profile component 20 in the installed position and already in a fastened state. In other words, the profile component 20 is fastened, for example, via a plurality of fastening means 22 (see FIG. 4) to the frame structural component 5, 6. In the present case, the profile component 20 is connected to both rib portions 5 and 6 or fastened thereto and connects these rib portions to form a static continuous rib 5.

While in the accompanying drawings the profile component 20 is fastened to a rib 5, 6, this only represents one example of a profile component 20. Naturally, a profile component 20 can also be attached and fastened to a stringer 7, a window frame 4, an outer skin 2 or a similar frame structural component. The details described herein are able to be applied and transferred equally to other frame structural components. The profile component 20 can also undertake further or different functions from joining structural components. For example, the profile component 20 can have a tab or protruding limb to which further aircraft components and/or aircraft structural components can be fastened. Merely as an example, the profile component 20 can also form part of a window frame 4 and/or be a fastening tab/limb for fastening a further window element to the window frame 4.

Figure 2:
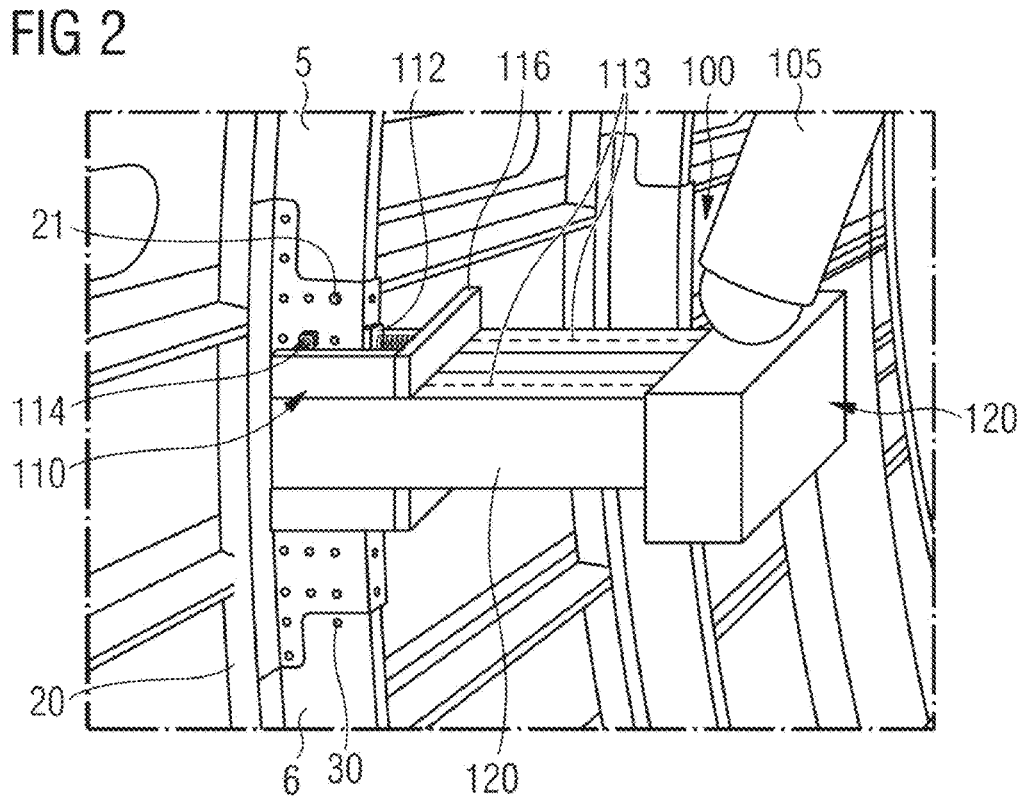
FIGS. 2 to 4 show schematically the mounting system of FIG. 1 in detail and with different operating steps.

FIG. 2 shows schematically a detail of the mounting system 100, in particular, the tool holder 120 at a free end of the robot arm 105. The tool holder 120 comprises a gripping device 110 which has a retaining bracket 116 which is designed to support the profile component 20 at least from one side. In FIG. 2 the retaining bracket 116 is shown as an L-shaped element, whereby two pressing units 112, 114 can be arranged on each limb of the retaining bracket 116. The pressing units 112, 114 permit the profile component 20 to be pressed from two directions substantially perpendicularly to one another. This is explained in more detail in FIGS. 5 and 6. Naturally, the retaining bracket 116 and/or the pressing units 112, 114 can also have a different shape. For example, depending on the shape of the profile component 20, the retaining bracket 116 can also be U-shaped, V-shaped, arcuate, a plate or the like, wherein it is possible to provide one or more pressing units 112, 114 which in each case push the profile component 20 from a specific direction onto the frame structural component 5, 6, 7. Each pressing unit 112, 114 and/or a portion of the retaining bracket 116 can be aligned such that a drive force of the pressing unit 112, 114 acts perpendicularly to a portion of the profile component 20 and/or perpendicularly to a portion of the frame structural component 5, 6, 7. The pressing unit 112, 114, in particular, is particularly effective when the portions of the profile component 20 and the frame structural component 5, 6, 7 are arranged parallel to one another and the drive force acts perpendicularly thereto.

The gripping device 110 is shown in FIG. 2 both on an upper face and a lower face of the tool holder 120. This can be implemented, on the one hand, by the gripping device 110, for example the retaining bracket 116, protruding through corresponding free portions of the tool holder 120 from the upper face to the lower face. Alternatively, the gripping device 110 can also comprise two retaining brackets 116, wherein one retaining bracket is arranged on the upper face and another retaining bracket is arranged on the lower face. Alternatively, the gripping device 110 can also comprise just one retaining bracket 116 which is arranged on the upper face or the lower face of the tool holder 120.

A stop 30, which is provided on the frame structural component 6, is also shown in FIG. 2. The stop 30 can be attached beforehand, for example as soon as one or more frame structural components 2, 4, 5, 6, 7 is/are accessible. The profile component 20 can be arranged (positioned) on the frame structural component 2, 4, 5, 6, 7 by the robot arm 105 and/or tool holder 120, such that the profile component 20 bears against the stop 30.

As can be identified in FIG. 2 (merely as an example), the profile component 20 is shaped such that in some portions it has a curved side edge. This curved side edge can be used to be placed against the stop 30, i.e., partially to surround and/or to come into contact with the stop 30. The stop 30 in any case helps the mounting system 100 to reach the end position of the profile component 20 rapidly and easily. Due to the curved side edge which bears against the stop 30, only one direction of movement of the profile component 20 is free (wherein the upper horizontal side edge in FIG. 2 can slide on the stop 30).

FIG. 2 also shows a fixing of the profile component 20 to the frame structural component 2, 4, 5, 6, 7 by a first fastening means 21. Merely by way of example, a rivet is shown as a first fastening means 21. Alternatively, any fastening means 21 can be used, provided it is suitable for producing a mechanical connection between the profile component 20 and the frame structural component 2, 4, 5, 6, 7.

The position of the first fastening means 21, shown in FIG. 2, is to be understood, merely by way of example, and can be located at any other position for fastening means (shown in FIG. 2 as dots). As is also explained in more detail relative to FIGS. 5 and 6, the tool holder 120 can comprise a fastener device 130. Thus, the profile component 20 can also be fixed to the frame structural component 2, 4, 5, 6, 7 at a position which in FIG. 2 is concealed by the tool holder 120 or the retaining bracket 116.

Figure 3:
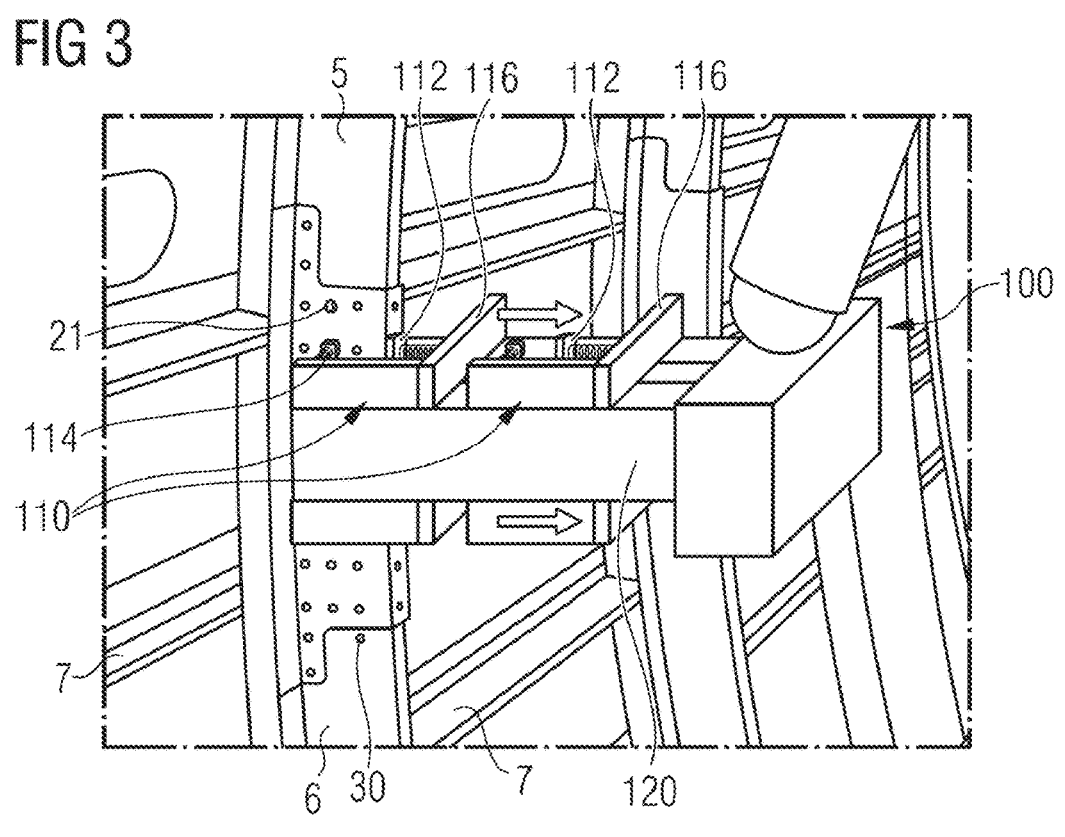

With the fixing by the first (single) fastening means 21 (and optionally by the stop 30) the gripping device 110 can now be removed from the profile component 20, as shown schematically in FIG. 3. For example, the retaining bracket 116 can be moved away from the profile component 20, whereby for example also the pressing units 112, 114 release their pressure from the profile component 20. This movement away from the profile component can be implemented, for example, by rails 113 (see FIG. 2) which are provided in the tool holder 120. The gripping device 110 can be moved away from the profile component 20 in or on the rails 113.

Naturally, the retaining bracket 116 can also be moved away from the profile component 20 in more than one direction, in order to release the pressure thereon. In the arrangement shown in FIG. 3, the fastener device 130 (see FIGS. 4, 6) can attach one or more second fastening means 22.

FIG. 3 shows a further possibility of attaching a stop 30. In contrast to the possibility which is shown in FIG. 2, here the stop 30 is attached to the frame structural component 6 such that the profile component 20 only bears with a side edge thereagainst. This permits a certain degree of flexibility when arranging the profile component 20 in its end position and permits, in particular, tolerance compensation.

Figure 4:
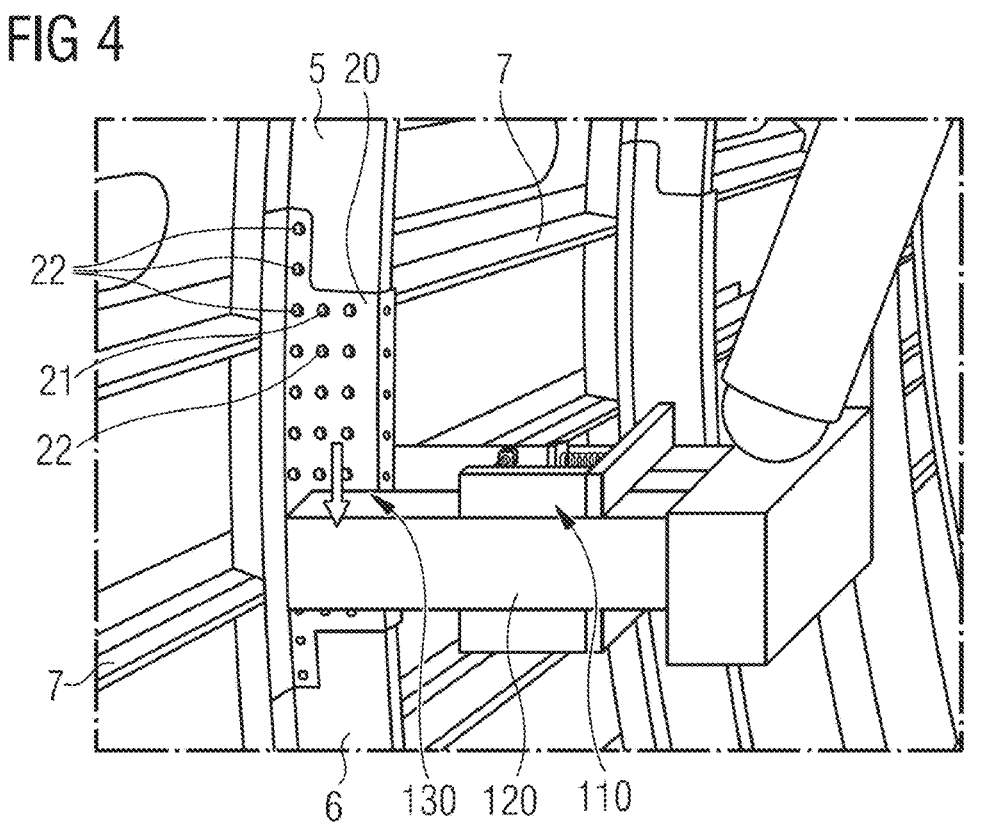

FIG. 4 shows schematically how the robot arm 105 moves the tool holder 120 stepwise downwardly, while the fastener device 130 places a plurality of second fastening means 22 in the profile component 20 and the frame structural component 2, 4, 5, 6, 7. Naturally, the movement can also take place sideways, in order to reach any position for a fastening means. Alternatively or additionally, the tool holder 120 can also be designed to move itself or the fastener device 130, i.e., without moving the robot arm 105. Alternatively or additionally, the fastener device 130 can also be designed to be moved in at least one direction relative to the tool holder 120, in order to stop at the corresponding positions for fastening means 22.

Figure 5:
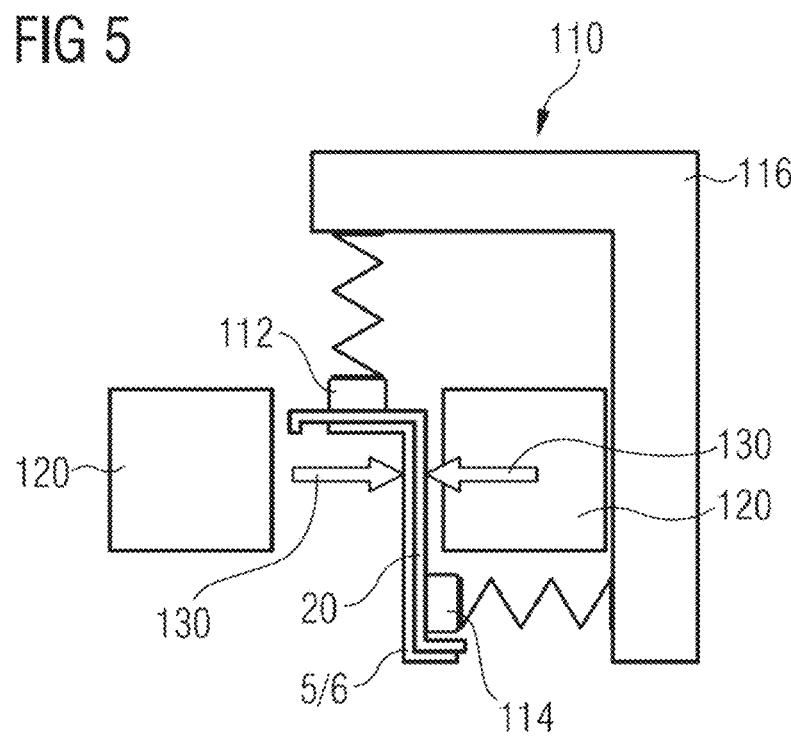
FIG. 5 shows schematically a variant of a tool holder.

FIG. 5 shows schematically a variant of a tool holder 120 in a sectional view. According to FIGS. 1 to 4, the tool holder 120 is arranged adjacent to a frame structural component 2, 4, 5, 6, 7, wherein a profile component 20 is already arranged in the end position on the frame structural component 2, 4, 5, 6, 7. The profile component 20 is pressed by pressing units 112, 114 from two directions (perpendicular to one another) onto the frame structural component 2, 4, 5, 6, 7. Due to the corresponding L-shaped or Z-shaped cross sections of the frame structural component 2, 4, 5, 6, 7 and the profile component 20, two pressing units 112, 114 are sufficient for holding the profile component 20 in the end position. The pressing units 112, 114 can be supported, for example, on the retaining bracket 116 or can be fastened thereto, wherein the retaining bracket 116 can be designed, for example, to be moved in the direction of the frame structural component 2, 4, 5, 6, 7 in order to generate a correspondingly high contact pressure. Moreover, the pressing units 112, 114 can comprise a spring element which exerts a spring force on the profile component 20. Alternatively or additionally, the pressing units 112, 114 can also have an active control element which can create (and also optionally remove) a compressive force on the profile component 20.

FIG. 5 also shows in each case a pressing pad or cushion on each pressing unit 112, 114, the pressing pad or cushion being positioned on the surface of the profile component 20. Instead of a pressing pad, or additionally thereto, it is also possible to provide a magnet or suction holder which supports the profile component 20 in an improved manner in the end position.

The tool holder 120 also comprises a fastener device 130. This fastener device can be implemented, for example, by a drill, a riveting tool, a screwing tool, a screwdriver, a welding head and/or an adhesive gun. Since the fastener device 130 is supported as far as possible from opposing directions and/or can act from opposing directions on the frame structural component 2, 4, 5, 6, 7 and the profile component 20, the tool holder 120 in the variant shown is C-shaped or U-shaped, wherein the fastener device 130 is arranged at the open end.

Figure 6:
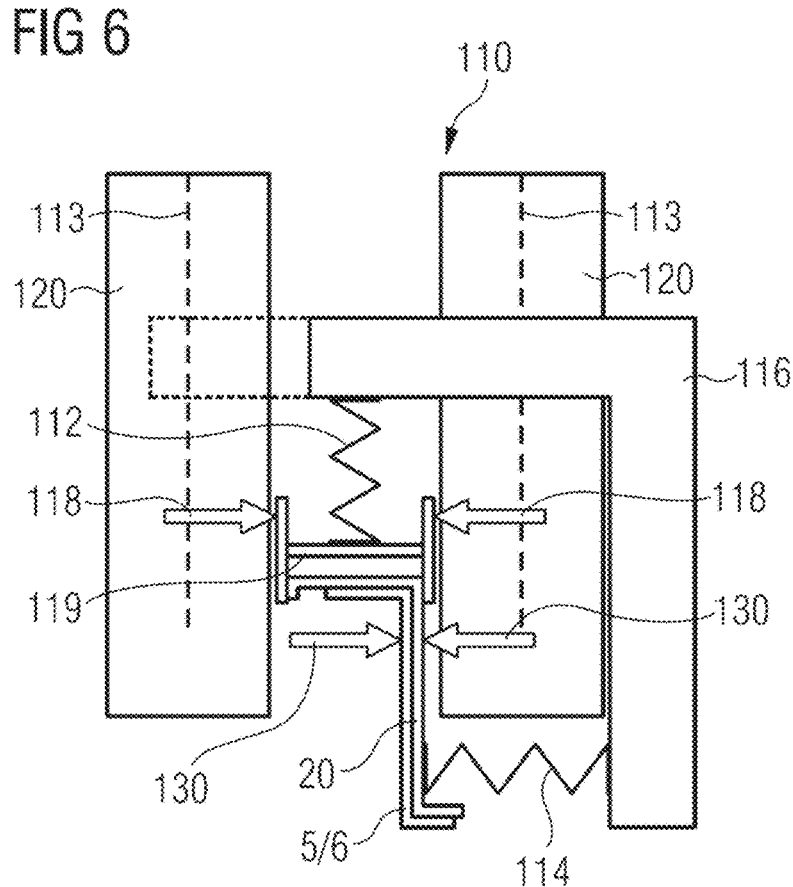
FIG. 6 shows schematically a further variant of a tool holder.

FIG. 6 shows schematically a further variant of a tool holder 120. The majority of elements of the tool holder 120 of FIG. 5 are also present in this variant. A difference from FIG. 5 is that a clamping device 118, 119 is provided. The clamping device 118 can optionally be a resilient element on opposing sides of the tool holder 120, or at least one active element which can be moved toward the profile component 20.

The clamping device 119 can also optionally be a bracket-shaped element as shown in FIG. 6. This bracket-shaped element can be designed such that it surrounds a side of the profile component 20 and clamps the profile component 20 therein. After the fastening of the profile component 20 to the frame structural component 2, 4, 5, 6, 7, the clamping device 118, 119 can simply be removed from the profile component 20 by overcoming the clamping force.

As in FIG. 5, in this variant at least one pressing unit 112, 114 can also be provided. Additionally, a pressing unit 112 can press the clamping device 119 onto the profile component 20.

In FIG. 6 the tool holder 120 is shown from its upper face (FIGS. 1 to 4). Optional rails 113 (shown in dashed lines) are located thereon, along which the gripping device 110 can be moved away from or toward the profile component 20. As options, the gripping device 110 is shown in solid lines such that it is arranged only on a portion (limb) of the tool holder 120, and is shown in dotted (dashed) lines such that it is arranged on both portions (limbs) of the tool holder 120.

In contrast thereto, in FIG. 5 the tool holder 120 is rotated by 90° which is merely to be understood as optional and is intended to show that the vehicle owner, the gripping device 110 and the fastener device 130 can be fastened in any position to the tool holder 120. Naturally, in the example according to FIG. 5, it is possible to provide at least one rail 113 (not shown in FIG. 5) along which the gripping device 110 can be moved.

FIG. 7 shows schematically a flow diagram of a method for mounting a profile component 20. The method can be carried out, for example, by a control unit 200 of the mounting system 100 (see FIG. 1), wherein the robot arm 105, the tool holder 120, the gripping device 110 and the fastener device 130 can be incorporated in the control by the control unit 200.

The method can start with an optional step 505 of the attachment of a stop 30 to the frame structural component 2, 4, 5, 6, 7. This step can be carried out independently of the actual start of the method described herein.

In another first step 510, the profile component 20 is picked up by a tool holder 120. The tool holder 120 can comprise a gripping device 110 which picks up the profile component 20. Then in step 520 the tool holder 120 is guided with the profile component 20 through an opening 3 in the outer skin 2 of the aircraft 1 into the interior of the aircraft 1. This guidance can be carried out, in particular, by the robot arm 105.

Then in a step 530, the profile component can be aligned by the tool holder 120 relative to the frame structural component 2, 4, 5, 6, 7. The alignment can also be carried out by the robot arm 105 or both by the robot arm 105 and the tool holder 120.

Furthermore, in step 540 the profile component 20 is arranged on the frame structural component 2, 4, 5, 6, 7 in an installed position and in a following step 550 fixed to the frame structural component 2, 4, 5, 6, 7 in the installed position. The fixing is carried out by a first fastening means 21.

The optional step 505 of the attachment of a stop 30 can also be carried out before step 530 and/or before step 540.

Then in step 560 the gripping device 110 is released from the profile component 20. For example, the gripping device 110 can be removed from the profile component 20 and/or remove one or more pressing units 112, 114 from the profile component 20.

Now in step 570 the profile component 20 can be fastened to the frame structural component 2, 4, 5, 6, 7 by at least one second fastening means 22. The first and second fastening means 21, 22 can be attached by a fastener device 130 arranged on the tool holder 120. Moreover, the first and second fastening means 21, 22 can be structurally the same, i.e., of the same type. For example, the fastener device 130 can be designed to attach only one type of fastening means 21, 22, where it firstly places the first fastening means 21 for fixing the profile component 20 and then the second fastening means 22 (or a plurality of second fastening means 22).

Finally, in an optional step 580 the tool holder 120 can be retracted through the opening 3. The method can now be repeated for a further profile component 20.

The systems and devices described herein may include a controller, control unit, such as control unit 200, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for mounting a profile component on an internal frame structural component of an aircraft, wherein the method comprises:

picking-up the profile component by a gripping device arranged on a tool holder;

guiding the tool holder through an opening in an outer skin of the aircraft into an interior of the aircraft, wherein the guiding of the tool holder is carried out by a robot arm;

aligning the profile component by the tool holder relative to the internal frame structural component;

arranging the profile component in an installed position on the internal frame structural component;

fixing the profile component to the internal frame structural component in the installed position by a first fastening means;

releasing the gripping device from the profile component; and fastening the profile component to the internal frame structural component by at least one second fastening means, wherein the first and second fastening means are attached by a fastener device arranged on the tool holder.

2. The method according to claim 1, further comprising: retracting the tool holder through the opening.

3. The method according to claim 1, wherein in the installed position, the profile component at least one of connects the internal frame structural component to a further internal frame structural component, reinforces the internal frame structural component, or forms a connecting element on the internal frame structural component for an aircraft component.

4. The method according to claim 1, further comprising:

attaching of a stop to the internal frame structural component at least one of before the aligning of the profile component or before the arranging of the profile component in the installed position.

5. The method according to claim 4, wherein at least one of the attaching of the stop is carried out by the fastener device, or wherein the stop is a fastening means.

6. A mounting system for mounting a profile component on an internal frame structural component of an aircraft, wherein the mounting system comprises:

a robot arm installed outside the aircraft;

a tool holder arranged at a free end of the robot arm and sized and configured to be guided through an opening in an outer skin of the aircraft into an interior of the aircraft by the robot arm, wherein the tool holder comprises a C-shape or U-shape with an open end;

a gripping device arranged on the tool holder and configured to pick-up and release the profile component;

at least one rail, wherein the gripping device moves, along a top surface of the at least one rail, away from or toward the profile component;

a fastener device arranged on the open end of the tool holder and configured to attach fastening means to fasten the profile component to the internal frame structural component;

a control unit coupled to the robot arm, the tool holder, the gripping device and the fastener device and configured to guide the robot arm through the outer skin of the aircraft into an interior of the aircraft, align the profile component by the tool holder relative to the internal frame structural component, and arrange the profile component in an installed position on the internal frame structural component; and, a first pressing unit and a second pressing unit configured to press the profile component onto the internal frame structural component in the installed position from two directions substantially perpendicular to one another.

7. The mounting system according to claim 6, wherein the fastener device comprises at least one of a drill, a riveting tool, a screwing tool, a screwdriver, a welding head, or an adhesive gun.

8. The mounting system according to claim 6, wherein the gripping device comprises at least one of:

a retaining bracket which is configured to support the profile component from at least one side and to hold the profile component on the internal frame structural component in the installed position, at least one clamping device which is configured to hold the profile component releasably in the gripping device, a magnet, or a suction holder.

9. The mounting system according to claim 8, wherein a portion of the profile component and the internal frame structural component are arranged parallel to one another.

10. The mounting system according to claim 8, wherein the retaining bracket is U-shaped, V-shaped, arcuate, or a plate.

11. The mounting system according to claim 10, wherein the retaining bracket comprises an L-shape.

12. The mounting system according to claim 11, wherein the first pressing unit is arranged on a first limb of the retaining bracket and the second pressing unit is arranged on a second limb of the retaining bracket.

13. The mounting system according to claim 6, wherein the upper surface of the tool holder has a first portion and a second portion.

14. The mounting system according to claim 13, wherein the at least one rail further comprises a first rail and a second rail and the first rail is arranged on the first portion of the tool holder and the second rail is arranged on the second portion.

15. The mounting system according to claim 14, wherein the first rail and the second rail extend along a pair of arms of the tool holder.

* * * * *